Jan. 28, 1947. K. L. EDGAR ET AL 2,415,032
MANUFACTURE OF FUEL TANKS
Filed May 19, 1945 4 Sheets-Sheet 1
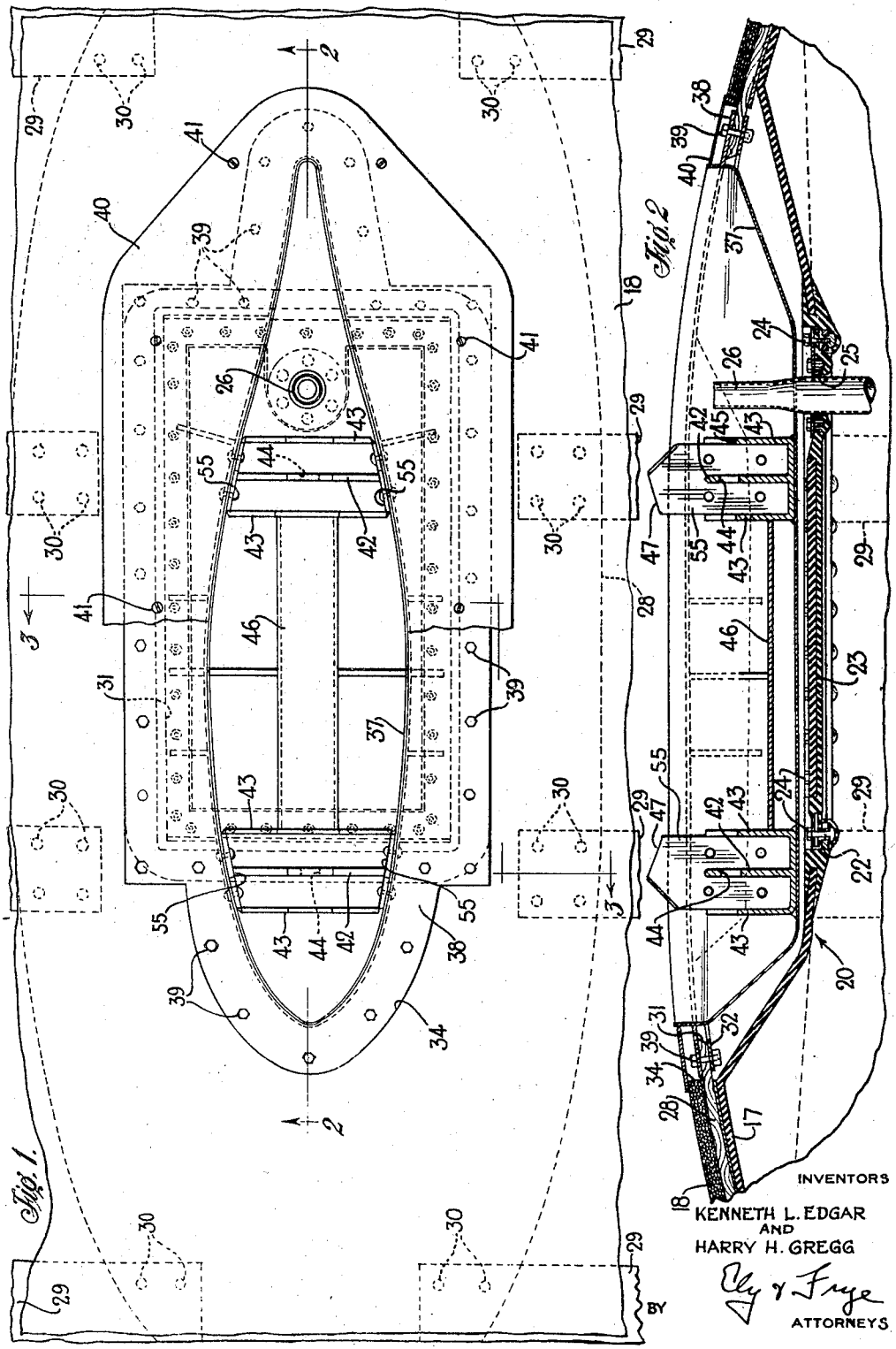
INVENTORS
KENNETH L. EDGAR
AND
HARRY H. GREGG
BY
ATTORNEYS Jan. 28, 1947. K. L. EDGAR ET AL 2,415,032
MANUFACTURE OF FUEL TANKS
Filed May 19, 1945 4 Sheets-Sheet 2

Inventors
KENNETH L. EDGAR
AND
HARRY H. GREGG

Attorneys

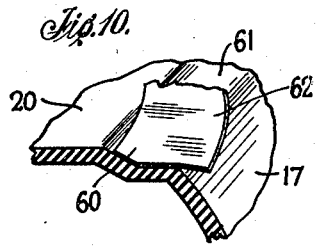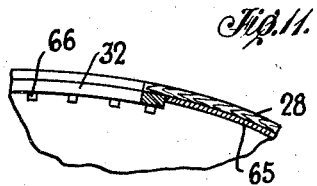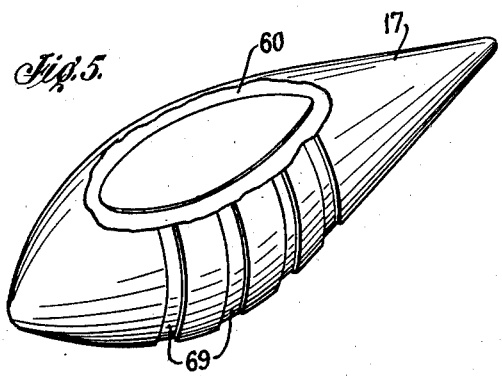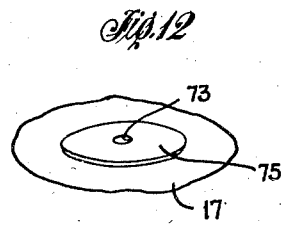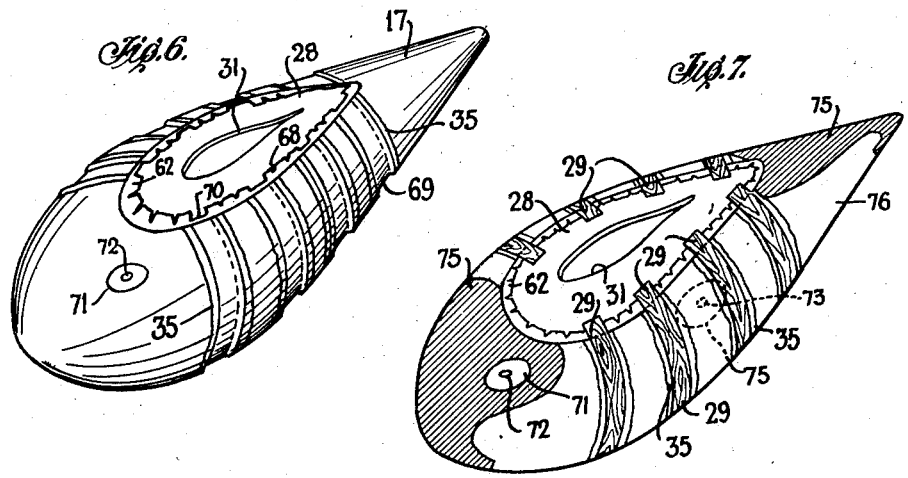

Jan. 28, 1947.  K. L. EDGAR ET AL  2,415,032
MANUFACTURE OF FUEL TANKS
Filed May 19, 1945  4 Sheets-Sheet 4
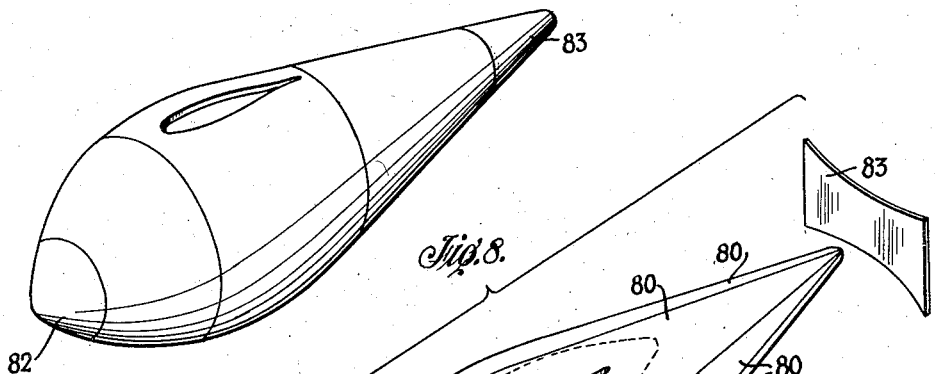
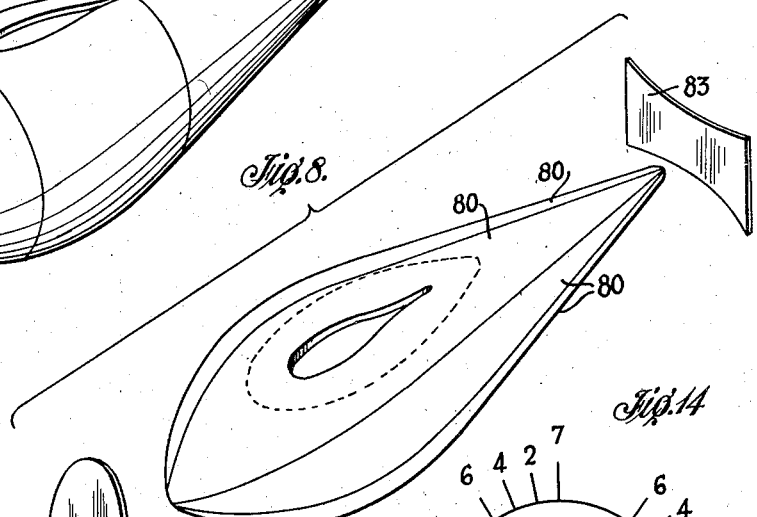
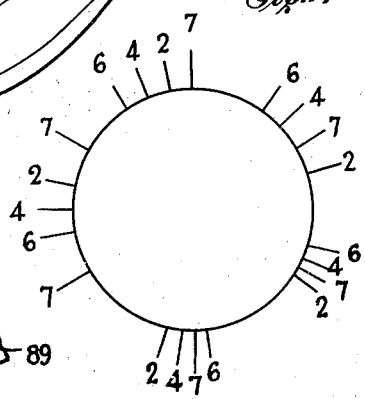
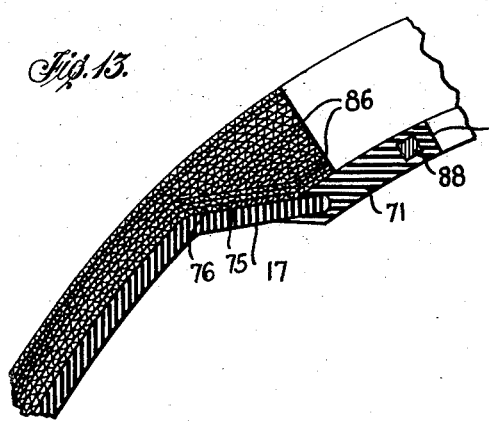
Inventors
KENNETH L. EDGAR
AND
HARRY H. GREGG Patented Jan. 28, 1947

2,415,032

UNITED STATES PATENT OFFICE 2,415,032

MANUFACTURE OF FUEL TANKS

Kenneth L. Edgar and Harry H. Gregg, Akron, Ohio, assignors to The Firestone Tire & Rubber Company, Akron, Ohio, a corporation of Ohio Application May 19, 1945, Serial No. 594,671

2 Claims. (Cl. 154—43.5)

This invention relates to the fabrication of supplemental bullet-sealing fuel tanks for aircraft which may be jettisoned or dropped when empty. More particularly, it relates to the manufacturing of such tanks which are of skin-stressed monocoque design.

Jettison fuel tanks of the type here contemplated are intended for equipping fighter aircraft for long-distance fighting and reconnaissance purposes, and the tanks are made self-sealing so that they may be carried through flak and gunfire. They are to be supported by bomb racks or the like mounted on the craft.

The fuel tanks to which this invention relates employ the minimum of metal, are of skin-stressed monocoque design, and require no bulkheads or other internal supporting structures. They are sufficiently strong and so constructed and united to the plane as to prevent distortion or swaying in flight. The various advantages of fabricating the tanks as here described will be more evident as the description proceeds.

In the accompanying drawings:

Fig. 1 is a fragmentary detail plan view of the fuel tank showing the means for fastening it to a plane;

Fig. 2 is a section on the line 2—2 of Fig. 1;

Figs. 5–9 illustrate the fuel tank in perspective at different stages in the construction of the outer skin of the tank, Fig. 5 illustrating the bullet-sealing tank or inner liner after application of the canopy reinforce, Fig. 6 illustrating the inner liner with the reinforce turned in in preparation for the application of the supporting plywood hoops, Fig. 7 the application of the hoops and first fabric coatings, and Figs. 8 and 9 the application of further coatings;

Fig. 10 is a detail in perspective showing the method of applying the canopy reinforce;

Fig. 11 is a detail in section showing the position of the metal backing plate;

Fig. 12 is a detail plan view of the underside of the tank showing the application of an adhesive ply around the fuel drain;

Fig. 13 is a sectional detail of the structure around a fitting; and

Fig. 14 is a conventional showing of the location of the seams between the successive longitudinal plies.

Figure 3:
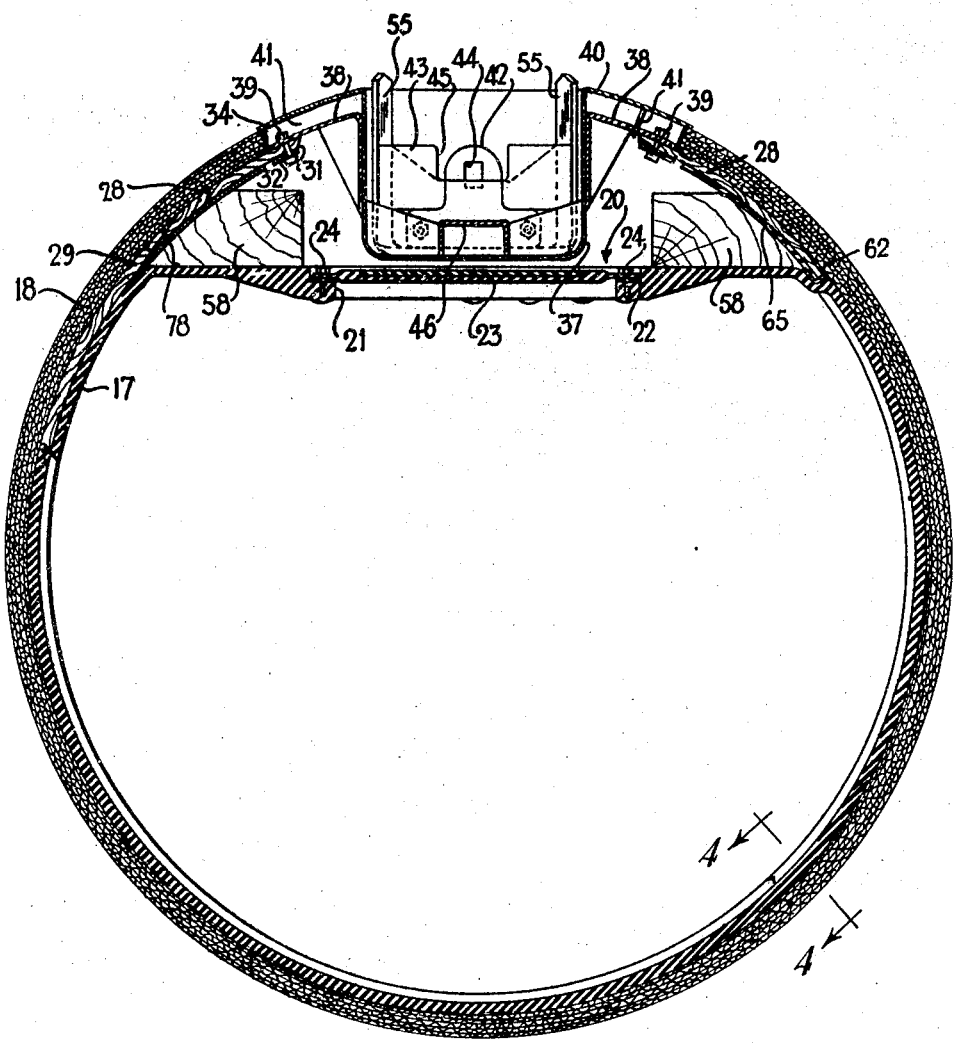
Fig. 3 is a section on the line 3—3 of Fig. 1.
Figure 4:
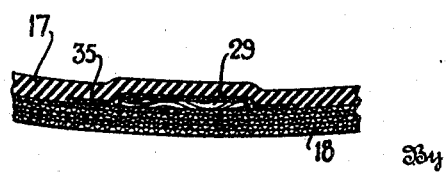
Fig. 4 is a section on the line 4—4 of Fig. 3.

To facilitate the understanding of the method of fabrication which is the subject of this invention, the structure of the tank as a whole will first be described with particular reference to Figs. 1–4, and thereafter the method of fabrication will be described in detail.

The fuel tanks are designed to be suspended from the bottom of the wings of a plane between the fuselage and the engine nacelles. Each fuel tank is releasably suspended from a wing by means such as a bomb shackle (not shown) which is preferably enclosed by fairing which serves to reduce wind resistance. For the same reason the fuel tanks are of streamline shape with substantially uninterrupted surface.

The fuel tank is of monocoque design and comprises an internal bullet-sealing lining or cell 17 and a rigid, external, nonmetallic shell or casing 18, which is fabricated as later explained in detail. The lining 17 is composed of a plurality of plies of treated fabric and sealing composition with an inner facing of material that is resistant to the action of hydrocarbon fuels. Since the composition of the lining is not a part of the present invention, a more detailed description thereof will not be given. At the top of the tank, in the medial region thereof, the lining 17 has a flattened region 20, Fig. 3, in which is located a manhole or access opening 21, the latter being rectangular in shape and having a metal reinforcing element 22 of similar shape built into its structure. The manhole 21 is closed by a cover 23 that is composed of composition similar to that employed in the remainder of the cell 17 and which has a reinforcing of metal in the margin thereof, said cover being secured in place by a plurality of cap screws 24 that extend through said cover and are threaded into the reinforcing 22 around the manhole. Adjacent its rear end the manhole cover 23 is formed with a marginally reinforced aperture 25 through which extends a pipe 26 that is utilized in withdrawing fuel from the tank. The access opening 21 is large enough to enable a small man to enter the tank for any purpose that may arise.

Positioned at the top of the cell 17 and covering a substantial region thereof, including part of the flattened region 20, is a canopy 28 that is composed of plywood. Said canopy is of oval shape in plan and is longitudinally and transversely arcuate in section so as to conform to the general contour of the tank. Circumscribing the cell 17 are a plurality of girth straps or hoops 29, 29, herein shown as four in number. The straps 29 are composed of plywood and have skived ends that are secured to complementally skived portions on the margin of the canopy 28 by means of wood screws 30 and glue, as shown in Fig. 1. The canopy has a relatively large central opening 31 that is located over the flattened medial region 20 of the cell 17, the shape of said opening being somewhat irregular, as will be apparent from Fig. 1. The margin of the opening 31 is reinforced by a metal backing plate 32 attached to the under or concave side thereof, said backing plate formed with a longitudinal series of apertures therethrough for a purpose presently to be explained.

The shell or casing 18 of the tank is composed of plies of fabric impregnated and bonded to each other with a suitable heat-hardened plastic composition. Of the plastic compositions found suitable for the purpose may be mentioned one composed of urea-formaldehyde and Buna S synthetic rubber, and another one composed of phenolic resin and Buna S. (Buna S is a synthetic rubber-like copolymer of butadiene and styrene.) When the first-mentioned composition is used, the cell or lining 17 must be vulcanized before the shell or casing 18 is constructed thereon since said composition is injured by the higher temperature required to vulcanize the cell. When the second composition is used in the shell, both lining and shell may be vulcanized at the same time if desired. The vulcanized shell is dense and hard and has substantial strength. It is to be understood that the plastic composition may be tacky so that plies coated with it will adhere to one another, or the plastic may be made tacky by the application of a liquid thereto.

The shell or casing 18 covers all of the cell 17 including the hoops 29 and all of the canopy 28 thereon except for an area adjacent the margin of the opening 31 therein, the margin of the shell about said opening being designated 34. The strips 35 (Fig. 4) unite the hoops 29 to the cell 17 and shell 18, as will be explained in greater detail in what follows.

Mounted within the opening 31 of the canopy is a deep metal pan 37 that has an integral marginal flange 38 that rests upon the exposed portion of the canopy within the shell opening defined by the margin 34, said pan flange being secured to the canopy by a plurality of cap screws 39, 39 that extend through the flange and canopy and are threaded into nuts 66 welded to the bottom of the metal backing plate 32 of the canopy. A thin metal cover plate or fairing 40 fitting closely around the pan 37 overlies the flange 38 and margin 34 of the shell opening and conceals the cap screws 39. The fairing is secured in place by countersunk screws 41 that are threaded into the flange 38. Welded and/or riveted in the pan 37 at two spaced apart points are respective brackets that extend completely across the same, each bracket comprising a central web 42 and reinforcing webs 43, 43 at opposite sides thereof. Each of said central webs is formed with an aperture 44 therein, and the tops of the webs 43 are centrally notched at 45 substantially as deep as the bottom of said aperture. Between the said brackets the pan is reinforced by a longitudinally extending inverted channel 46 welded to the bottom of the pan. Said brackets have end walls 55 that extend upwardly above the top margin of the pan, the upper margin of each of said end walls being formed with two oblique surfaces meeting at a point, one of said oblique surfaces, designated 47, being provided for a purpose presently to be explained. The bottom of the pan is formed with a suitable aperture to enable the fuel pipe 26 to extend therethrough.

The fuel tank is suspended from an aircraft through the agency of bomb shackles that engage the webs 42 of the brackets in pan 37 and extend through the apertures 44 therein. The bomb shackles are of the conventional type used for releasably carrying bombs. The fairing that surrounds the bomb shackles is of the same body contour as the pan 37, and is arranged to be received within the latter when the fuel tank is suspended from the bomb shackles. The bottom margin of the fairing is shaped to conform to the contour of the bottom of the pan 37 and is notched on each side thereof to span the webbed brackets within the pan. When the fuel tank is suspended from the bomb shackles, the end walls 55 of the said brackets are disposed exteriorly of the said fairing, the oblique marginal surfaces 47 of said end walls engaging complementally oblique faces formed on opposite ends of respective bearing strips that are mounted on opposite sides of the fairing structure. The arrangement assures accurate registry of the fuel tank with its supporting structure and provides stability by preventing side sway and longitudinal oscillation or tilting of the fuel tank.

Preferably some of the space between the canopy 28 and the flattened region 20 of the lining or cell 17 at each side of pan 37 is filled with suitably shaped blocks of wood 58, which may be of balsa because of its light weight.

The fuel tank will hold its shape in flight and under all conditions of loading, yet employs but little metal in its construction. The entire load of the tank is carried by the stressed skin or shell 18 thereof, and the presence of the rigid plywood canopy 28 which extends about 30 per cent of the area of the top of the tank insures adequate distribution of the load. Furthermore, the arrangement for attaching the tank to an aircraft prevents swaying of the tank during flight. The location of the pan 37 within the tank and substantially below the canopy 28 protects the pan against gunfire such as might result in loosening or separating the fuel tank from the airplane. Also, the presence of the webs 43 at opposite sides of the central webs 42, that are engaged by the shackles, additionally protect the webs 42 from gunfire.

*Manufacture of nonmetallic shell*

The first step in the manufacture of the nonmetallic shell 18 is to prepare the bullet-sealing tank for the placement of the canopy. This is done by placing the so-called canopy skirt reinforce 60 in place in the canopy recess 61, which is formed around the outer edge of the flattened region 20 of the bullet-sealing cell or liner 17. Fig. 10 is a detail showing the manner of application. The inside edge of the reinforce for a distance of at least about 2 inches is cemented in the recess. This leaves an uncemented flap 62 which is later folded back over the canopy as shown in Fig. 7. This flap ties the plywood canopy in place and provides a union between the canopy 28 and the shell 18 and the lining 17. It prevents steam used in the subsequent vulcanization from penetrating between the outer nonmetallic shell 18 and the inner bullet-sealing construction 17. The fabric used for making the reinforce, before being cut to size, is treated with rubber or other curable adhesive which on subsequent vulcanization will unite with the bullet-sealing liner 17.

The plywood canopy 28 is now prepared for placement. The underside of the canopy is coated with a ply 65 of fabric which is treated with a suitable plastic material which is preferably the same as the plastic used for treating the other plies of the nonmetallic shell. It protects the canopy from the steam used in the subsequent vulcanization and serves to strengthen the bond between the canopy and the reinforce.

This ply 65 is trimmed so that it does not overlap the metal backing plate 32. The nuts 66 (Fig. 11) are welded to the underside of the metal backing plate in line with perforations in the plate so that the pan 37 may be easily screwed in place.

The edge of the canopy which is to contact the canopy reinforce is now painted with a self-curing or precured adhesive, and the upper surface of the canopy reinforce is similarly treated. The canopy is then put in place and cemented in position with a suitable oil-resistant cement, such as a solution of a rubber-like copolymer of butadiene and acrylonitrile.

The edge of the skirt or canopy reinforce is cut with dutchmen 68 which should not be over an inch and a half deep so that the skirt 62 will lie flat against the upper surface of the canopy. The flap 62 will overlie the upper surface of the canopy for a distance of about 2 inches from the edge of the canopy, except adjacent the depressions 69 in the lining which are to receive the plywood bands or hoops 29, and here at 70 the width of the overlap should not be greater than ½ inch.

Strips of bonding material 35, somewhat wider than the hoops 29, are then put in place as shown in Fig. 6. These strips are of fabric coated on the underside with a curable adhesive, such as rubber or the like, which will form a good bond with the liner 17. The strips 35 are preferably cut on a 45-degree bias. The ends of the strips are trimmed flush with the canopy reinforce 66.

When a bullet-sealing tank is pierced by a bullet, the wall of the tank quickly returns to its original position to effect the sealing of the hole. It is important in forming the outer shell of the tank that there be as little interference as possible with such return of the bullet-sealing cell to its original location. If the outer nonmetallic skin were cemented to the outer surface of the bullet-sealing cell, the rigidity of the outer skin would interfere with this self-sealing property of the cell. It might, therefore, seem desirable to merely fit the outer shell around the bullet-sealing tank without any adherence between the two. However, with such a construction the bullet-sealing liner sags away from the outer shell at the top and on the ends when the tank is subjected to gravity loading due to diving or other plane maneuvers.

It has, therefore, been found desirable to secure adherence between the outer shell and the bullet-sealing tank in restricted areas. Such adherence is desirable around the fittings and at the ends of the tank. This is shown in Fig. 7, which shows the fitting 71 to which the cap 72, which covers the opening for filling the fuel into the tank, is fastened. It, likewise, shows the fitting 73 in which the drain opening (not shown) is provided. These fittings are preferably of oil-resistant synthetics, such as Buna N. The local adherence between the bullet-sealing liner 17 and the outer shell is obtained by the plies 75. These are coated on the undersurface with rubber or other curable adhesive which gives a good bond with the liner 17 on curing. Their outer surface is brushed with a solution of a plastic, such as that used on the other plies of the skin to produce adherence between them.

If the inner cell is cured before the outer skin, these plies 75 are put in place before this curing step is effected. Although they are preferably placed over the U flange of the fittings 71 and 73, as illustrated in Fig. 13, they may, if preferred, be laid over the liner 17 within the jaws of the U flanges of the fittings before these are closed. The plies 75 advantageously cover the area around the fittings for a distance of about 6 inches.

A ply of nonadhering material 76 of the same thickness as the plies 75 is placed over the remainder of the tank; i. e., the surface thereof not covered by the plies 75 and the strips 35. The ply 76 does not permanently adhere to the bullet-sealing cell but is coated on its outer surface with plastic adhesive so that it adheres to, and on vulcanization becomes a part of, the outer nonmetallic covering. The plies 75 and 76 are trimmed flush with the edge of the canopy.

The cell is now prepared for placement of the plywood bands 29 by brushing the outer surface of the strips 35 with a plastic adhesive which forms a strong bond with the plywood bands. The outer surface of the canopy where the plywood bands are to be placed, is skived so that the outer surface of the bands will lie flush with the outer surface of the canopy. The skiving is illustrated at 78 in Fig. 3. The canopy is then drawn tight against the cell before placing the plywood bands 29 in place. This is advantageously accomplished by encircling the canopy and tank with metal bands or straps supplied with turn buckles or the like for drawing the canopy tight against the lining 17. The underside of each of the plywood bands is then coated with a suitable adhesive, and the bands are applied over the strips 35, and the end of each is fastened into the canopy by four wood screws 30 (Fig. 1). The edge 62 of the canopy reinforce is then pressed to the upper surface of the canopy. Any void between the edge of the canopy and the shell is then suitably filled with small strips of fabric treated with the curable adhesive.

The cell is now ready for the application of the outer fabric plies. These plies are composed of fabric treated with a curable plastic. As previously suggested, this plastic may be a mixture of an urea-formaldehyde thermoset and Buna S synthetic rubber or may be a mixture of a phenolic resin and Buna S. The plastic is compounded with suitable vulcanizing ingredients. The cell and canopy are alternately covered with longitudinal and transverse plies. It is advantageous to first apply longitudinal plies of fabric, and these are indicated by the reference numeral 80 in Fig. 8. These constitute the second ply of the shell. There are five of these pieces extending from one end of the cell to the other. The joints located at the positions 2 of Fig. 14 are all butt spliced. The fabric is advantageously cut on a bias of about 20 degrees.

Transverse plies are then applied circumferentially as indicated in Fig. 9. The nose piece 82 is formed from a flat disk which is shown in place ready for application in Fig. 8. The tail piece is formed of a piece 83 having the contour illustrated in Fig. 8. After placing, the edges of the piece 83 are trimmed so that the piece 83 lies flat. The intermediate pieces are laid as shown with butt splices at the seams. There is no bias to these pieces which constitute the third ply.

The filler fitting 71 and drain fitting 73 are in depressed areas so that no bolts or the like protrude from the surface of the cell to interfere with its streamlined contour. Fig. 13 shows how, after the depressed areas have been covered with the first three plies, filler pieces 86 of fabric coated with the curable adhesive are used to reduce the size of the depressed areas around the drain and filler openings. Fig. 13, likewise, shows a ring 88 embedded in the fitting which has threaded openings therein to receive bolts used to bolt the cap 72 (Fig. 7) in place over the opening 89.

After placing the filler pieces 86 in place, additional coverings are applied to the entire surface of the tank. There are altogether seven plies in the preferred nonmetallic shell structure described herein and shown in the drawings. Each of these plies (except the first which is treated as described) is coated with a curable plastic so that the plies are all united into a unitary shell on subsequent vulcanization. The first ply which is a composite, some of which adheres to the lining and some of which does not adhere, is shown in Fig. 7. Fig. 8 shows the second ply of covering material. The third ply is illustrated in Fig. 9. The fourth ply is of the type illustrated in Fig. 8, preferably cut on a 20-degree bias, the longitudinal splices being located several inches to one side of the second ply splices illustrated in Fig. 8. The arrangement of the splices in the longitudinal plies is shown in a conventional manner in Fig. 14, the numerals indicating the number of the ply the seams of which are located at the respective positions indicated by the locations of the respective numbers. For example, at the top of the figure are the numerals 6, 4, 2, and 7. These indicate the location of the splices in the sixth, fourth, second, and seventh plies, respectively.

The fifth ply is of the type illustrated in Fig. 9, but the caps covering the ends extend back a couple of inches further than the caps 82 and 83, respectively, and the location of the intermediate splices is staggered somewhat. There is no bias to the pieces in this ply.

The sixth ply is built up of longitudinal pieces of material similar to those illustrated in Fig. 8. The fabric is preferably cut on a 20-degree bias. The splices are staggered somewhat from the splices of the prior plies as indicated in Fig. 14.

The sixth ply is covered by a seventh ply, the pieces of which also run longitudinally in the manner shown in Fig. 8. The pieces are cut on a 20-degree bias, and the splices are staggered somewhat from the splices of the preceding plies as indicated in Fig. 14.

Each of the splices in the last ply of material is covered by a reinforce coated with curable plastic which is carefully pressed or stitched down to prevent any separation. The edges around the fittings are carefully calked with cement of a suitable oil-resistant plastic material, and these are allowed to thoroughly dry.

Constructed in this manner with each of the plies carefully spread out so as to fit tight against the previously laid ply of material, the strong, serviceable, nonmetallic skin covering is produced which together with the metal backing plate and the anchoring means takes up the stresses suffered by the fuel tank when suspended from an airplane as contemplated.

The nonmetallic covering must be cured to unite the various plies and make a unitary cover. If the covering plies have incorporated therein a mixture of an urea-formaldehyde resin and uncured Buna S, two curing operations will be required. The bullet-sealing tank with the plies 75 and strips 35 in place will be separately cured before the skin-covering plies are applied. This cure will be effected at a temperature in the neighborhood of 300° F. Then after the outside cover plies have all been put in place, the resin in these plies will be heated to about 240° F. for curing. A combined steam-air cure has been found desirable, using steam at about 60 pounds' pressure. A longer time will be required to cure with air alone. The cell 17 is built over a frangible core (not shown), which core will preferably be allowed to remain until after the outside cover has been completed and cured although in rare instances it may be removed from the bullet-sealing cell before the outside plies and canopy are placed. A papier-maché or plaster core has been found suitable.

If a phenolic resin which requires a higher temperature for curing is incorporated in the plies of the outer shell—e. g., a mixture of a phenolic resin and uncured Buna S—a single cure is all that is required. The outer covering will then be built around the fuel-cell lining while the lining is still in the green state and on the core. A suitable cure might, for example, be 300° F. for 10 minutes followed by turning off the heat and allowing the temperature to drop for 17 minutes, at the end of which time it will be about 275° F. This temperature of 275° F. should be maintained for 90 minutes.

After curing, regardless of which curing method is employed, the entire assemblage is sprayed with water to cool it. The core is then removed from the interior of the finished tank, and the interior of the tank is carefully cleaned out. The tank is then ready for completion by insertion of the pan 37, etc.

Although the use of the pan 37 for coupling with bomb shackles has been illustrated, it is obvious that any method of coupling the tank to a support on the plane may be used. Modification may be resorted to without departing from the spirit of the invention or the scope thereof as defined by the appended claims.

What we claim is:

1. The method of fabricating a jettisonable fuel tank with a bullet-sealing lining which comprises curing the lining with flattened top surrounded by a recess for reception of a canopy and encircling depressions in the walls thereof for the reception of reinforcing hoops, affixing a reinforcing strip in the recess with a flap extending outwardly therefrom, placing the canopy on the strip, turning the flap back over the edges of the canopy, putting the reinforcing hoops in place and fastening them to the canopy, and then covering the hoops and most of the canopy with plies of fabric treated with a curable plastic and curing.

2. The method of fabricating a jettisonable fuel tank with a curable bullet-sealing lining with a flattened top surrounded by a recess for reception of a canopy and encircling depressions in the walls thereof for the reception of reinforcing hoops, which comprises affixing a reinforcing strip in the recess with a flap extending outwardly therefrom, placing the canopy on the strip, turning the flap back over the edges of the canopy, putting the reinforcing hoops in place and fastening them to the canopy, covering the lining and the hoops and most of the canopy with plies of fabric treated with a curable plastic, and then simultaneously curing the lining and plies.

KENNETH L. EDGAR.
HARRY H. GREGG.